(12) United States Patent
Kosmos

(10) Patent No.: US 11,668,568 B2
(45) Date of Patent: Jun. 6, 2023

(54) SURVEY MARKING ROD

(71) Applicant: Jason Kosmos, Beatrice, NE (US)

(72) Inventor: Jason Kosmos, Beatrice, NE (US)

(*) Notice: Subject to any disclaimer, the term of this patent is extended or adjusted under 35 U.S.C. 154(b) by 30 days.

(21) Appl. No.: 17/320,452

(22) Filed: May 14, 2021

(65) Prior Publication Data
US 2022/0364860 A1 Nov. 17, 2022

(51) Int. Cl.
*G01S 19/14* (2010.01)
*G01S 19/42* (2010.01)
*G01C 15/06* (2006.01)

(52) U.S. Cl.
CPC .............. *G01C 15/06* (2013.01); *G01S 19/14* (2013.01); *G01S 19/42* (2013.01)

(58) Field of Classification Search
CPC .......... G01S 19/14; G01S 19/42; G01C 15/06
USPC ................................................... 342/357.25
See application file for complete search history.

(56) References Cited

U.S. PATENT DOCUMENTS 6,330,503 B1 * 12/2001 Sharp .................... E01C 23/163
404/93
7,500,583 B1 * 3/2009 Cox ........................ G01C 15/02
222/402.1
9,177,403 B2 * 11/2015 Nielsen ................ G09B 29/007

FOREIGN PATENT DOCUMENTS

| CA | 2300333 A1 * | 9/2000 | ............ G01C 15/02 |
| CA | 2833184 A1 * | 10/2012 | ............ B64C 19/00 |
| CN | 211855353 U * | 11/2020 | |
| CN | 213147832 U * | 5/2021 | |
| JP | 6138720 B2 * | 5/2017 | |

* cited by examiner

*Primary Examiner* — Harry K Liu
(74) *Attorney, Agent, or Firm* — Lyman Moulton, Esq.; Moulton Patents, PLLC

(57) ABSTRACT

The present invention improves upon the existing GPS survey rod with a rover mount, a collector mount, and a lever to spray the paint. The bottom part of the GPS survey rod includes the paint canister insert, and the spray paint tip. There are three holes in the tip of the rod to expel the paint. This product is made of aluminum or carbon fiber, a very light weight yet durable material. Specially designed paint cans and conventionally paint cans are used in this device. This tool will allow the user to be more efficient by merging two jobs and devices into one. The disclosure additionally includes a linkage between the activation lever and the bottom part configured to depress a nozzle of the paint can in response to a depression of the activation lever.

15 Claims, 3 Drawing Sheets

(Bottom view)

(Bottom view)

SURVEY MARKING ROD

BACKGROUND

Surveying or land surveying is the technique, profession, art and science of determining the terrestrial or three-dimensional positions of points and the distances and angles between them. A land surveying professional is called a land surveyor. These points are usually on the surface of the Earth, and they are often used to establish maps and boundaries for ownership, locations, such as building corners or the surface location of subsurface features, or other purposes required by government or civil law, such as property sales. Additionally, surveying is an important tool for research in many scientific disciplines.

Surveyors use many tools, such as total stations, GNSS receivers, theodolite, 3D scanners, radios, handheld tablets, subsurface locators, drones, GIS, surveying software, surveying rod, and others. GPS systems have increased the speed of surveying. The present invention relates to the GPS survey rod.

SUMMARY OF THE INVENTION

The invention includes a GPS survey rod, a cylindrical paint canister fitted in the bottom half of the rod, a GPS collector, a trigger on the top half, and a paint tip. There are three holes in the tip of the rod to expel the paint. This product is made of aluminum or carbon fiber, a very light weight yet durable material. Specially designed paint cans and conventional paint cans are used in this device. This tool will allow the user to be more efficient by merging two jobs and devices into one.

The disclosed survey marking rod includes a top part having a top end and a bottom end and a paint can activation lever and at least one GPS (global positioning system) mount attached thereto. The disclosure also includes a bottom part comprising a top end and a bottom end and configured to receive a paint can wherein the bottom end of the top part mates with the top end of the bottom part. The disclosure additionally includes a linkage between the activation lever and the bottom part configured to depress a nozzle of the paint can in response to a depression of the activation lever. The disclosure further includes a paint tip immediately adjacent the bottom end of the bottom part and comprising a plurality of jet holes for an egress of paint from the paint can onto a marking surface for a survey.

Figure 1:
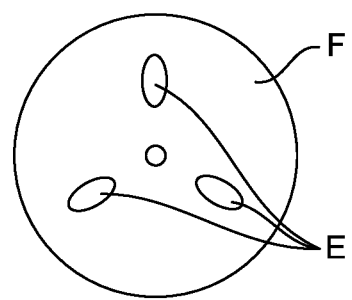
FIG. 1 depicts a bottom view of the survey marking rod in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

A rover is a GPS receiver located on a pole or tripod which is moved around from point to point for the purpose of locating evidence or setting points. It normally receives correction data from a reference station in surveying. A collector receives survey information from the rover. Position correctional data is transmitted from a GPS receiver at a fixed and known station to a rover such that the rover can calculate a more accurate position that it would have without the correctional data.

FIG. 1 depicts a bottom view of the survey marking rod in accordance with an embodiment of the present disclosure. The bottom tip of the survey marking rod F has three paint jet holes E where paint is expelled when a user pushes the lever G on the upper end of the rod. This function allows the user to mark the area that is being surveyed using only one device. The user also does not need to bend over to get paint where it is needed for markings. Three or more holes, plus or minus an arbitrary number, are also used to transfer paint from the paint can onto a proximally adjacent surface.

Figure 2:
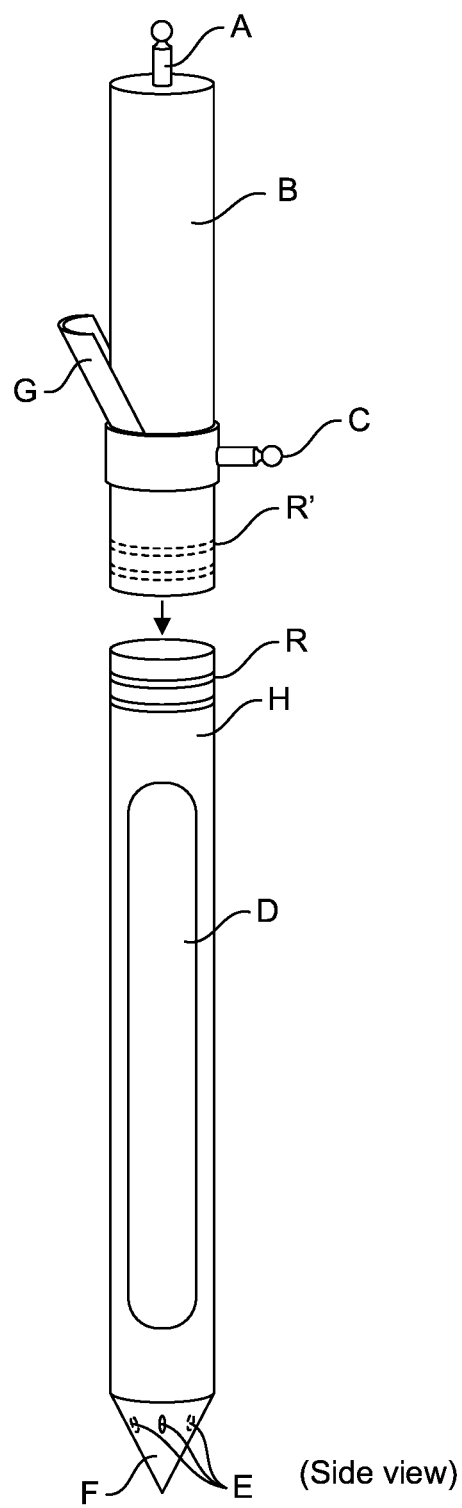
FIG. 2 depicts an exploded side view of the survey marking rod in accordance with an embodiment of the present invention.

FIG. 2 depicts an exploded side view of the survey marking rod in accordance with an embodiment of the present invention. On the top part of the GPS survey rod B, made of Aluminum or Carbon Fiber, there is a rover mount A, a collector mount C, and a lever to spray the paint G. The bottom part of the GPS survey rod H, made of Aluminum or Carbon Fiber, includes the paint canister insert D, and the spray paint tip F and the paint jet holes E therein which can be elliptical or circular depending on a desired geometry of the resulting mark. The helical and circumferential complementary threads, annular grooves and ridges R and R' allow for a mating of respective ends in a telescoping arrangement or in a clicking or threading arrangement according to model types and applications.

Figure 3:
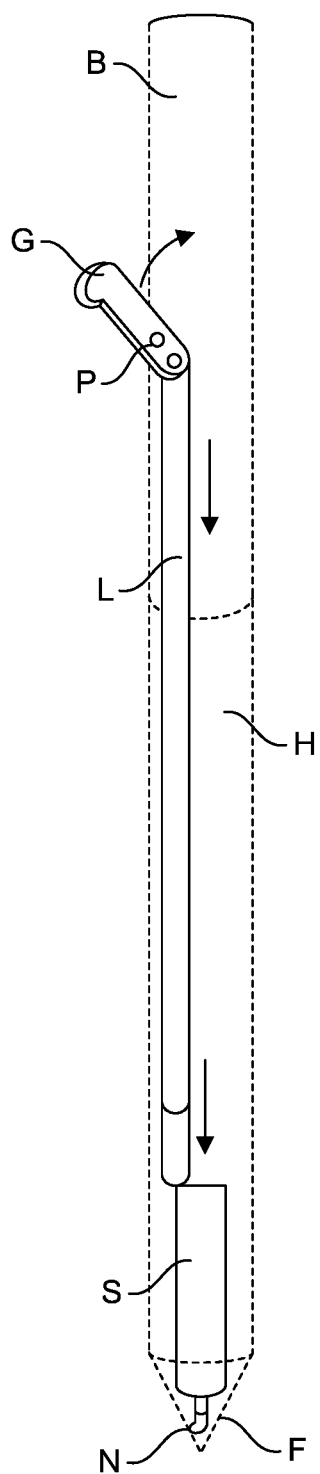
FIG. 3 depicts the linkage of the top part to the bottom part to activate a spray can received in the bottom part through a lever in the top part according to an embodiment of the present disclosure.

FIG. 3 depicts the linkage of the top part to the bottom part to activate a spray can received in the bottom part through a lever in the top part according to an embodiment of the present disclosure. The depiction includes the top part B, the bottom part H in broken line cut away views. The depiction also includes the lever G, the pivot pin P, the linkage L, the spray paint can S and the spray can nozzle N as shown. The arrows depicted show a transfer of force across the lever down through the marking rod or cylinder and onto a bottom end of the paint to depress the nozzle against the paint tip F and force spray paint through the holes E onto a survey surface such as a road, sidewalk, earth etc.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein in a non-provisional specification to follow.

What is claimed is:

1. A marking rod comprising:
   a top part comprising a top end and a bottom end and a paint can activation lever and at least one GPS (global positioning system) mount attached thereto;
   a bottom part comprising a top end and a bottom end and configured to receive a paint can wherein the bottom end of the top part mates with the top end of the bottom part;
   a linkage between the activation lever and the bottom part configured to depress a nozzle of the paint can in response to a depression of the activation lever; and
   a paint tip immediately adjacent the bottom end of the bottom part and comprising a plurality of jet holes for an egress of paint from the paint can onto a marking surface for a survey,
   wherein the plurality of jet holes are elliptical and are at least 3 in number.

2. The marking rod of claim 1, wherein the at least one GPS mount comprises a rover mount disposed at the top end thereof.

3. The marking rod of claim 1, wherein the at least one GPS mount comprises a collector mount disposed on a lateral side thereof.

4. The marking rod of claim 1, wherein the paint can activation lever is activated when depressed against a lateral side of the top part.

5. The marking rod of claim 1, wherein the at least one GPS mount comprises a post and ball configuration disposed on a lateral side thereof.

6. The marking rod of claim 1, wherein the bottom part defines an opening to receive a paint can having a nozzle pointed downward toward the paint tip.

7. The marking rod of claim 1, wherein the bottom part further comprises a bottom lever configured to receive a force from the linkage and transfer the force against an end of the paint can.

8. The marking rod of claim 1, wherein the jet holes of the paint tip are proximal an apex of the paint tip to allow the egress of a spray paint from a nozzle of the paint can there through.

9. The marking rod of claim 1, wherein the top part and the bottom part mate via complementary helical threads in respective ends thereof.

10. The marking rod of claim 1, wherein the linkage comprises an internal rod between the paint can activation lever and a bottom lever to transfer a downward force against an end of the paint can and depress a nozzle of the paint can against the paint tip.

11. The marking rod of claim 1, wherein the paint tip attaches to the bottom end of the bottom part via complementary helical threads in respective ends thereof.

12. The marking rod of claim 1, wherein the top part and the bottom part mate via a telescoping of respective parts against each other wherein the top part has nominally larger diameter than a diameter of the bottom part.

13. The marking rod of claim 1, wherein the top part comprises annular grooves on an inside circumference thereof.

14. The marking rod of claim 1, wherein the bottom part comprises annular ridges on an outside circumference thereof.

15. The marking rod of claim 1, wherein the top part comprises annular grooves on an inside circumference thereof and the bottom part comprises complementary annular ridges on an outside circumference thereof.

* * * * *